US011487459B2

(12) United States Patent
Fukuda et al.

(10) Patent No.: US 11,487,459 B2
(45) Date of Patent: Nov. 1, 2022

(54) INFORMATION PROCESSING APPARATUS, INFORMATION PROCESSING SYSTEM, AND RECORDING MEDIUM STORING PROGRAM

(71) Applicant: FUJITSU LIMITED, Kawasaki (JP)

(72) Inventors: Shinichiro Fukuda, Kawasaki (JP); Takashi Nonaka, Yokohama (JP); Kaname Takaochi, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 17/070,970

(22) Filed: Oct. 15, 2020

(65) Prior Publication Data

US 2021/0157482 A1     May 27, 2021

(30) Foreign Application Priority Data

Nov. 27, 2019   (JP) .............................. JP2019-213846

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0689* (2013.01)

(58) Field of Classification Search
CPC ...... G06F 3/065; G06F 3/0619; G06F 3/0689; G06F 3/0605; G06F 3/0617; G06F 3/0635
See application file for complete search history.

(56) References Cited

U.S. PATENT DOCUMENTS

| 7,809,691 | B1 * | 10/2010 | Karmarkar .......... G06F 11/1464 707/681 |
| 2004/0260873 | A1 * | 12/2004 | Watanabe ........... G06F 11/1456 711/114 |
| 2007/0008890 | A1 * | 1/2007 | Tseitlin ............... G06F 11/1662 718/100 |
| 2009/0271582 | A1 | 10/2009 | Ninose |
| 2016/0371136 | A1 | 12/2016 | Sato |
| 2019/0129816 | A1 | 5/2019 | Nonaka et al. |
| 2022/0066886 | A1 * | 3/2022 | Wang ...................... G06F 16/21 |

FOREIGN PATENT DOCUMENTS

| JP | 2009-266120 | A | 11/2009 |
| JP | 2019-082897 | A | 5/2019 |
| WO | 2015/198449 | A1 | 12/2015 |

* cited by examiner

*Primary Examiner* — Jason W Blust
(74) *Attorney, Agent, or Firm* — Fujitsu Patent Center

(57) ABSTRACT

An information processing apparatus includes: a memory; and a processor coupled to the memory and configured to: perform mirroring of data with a first information processing apparatus and switches from a standby system to an active system with operation shutdown of the first information processing apparatus to operate as a second information processing apparatus, the information processing apparatus; determine whether or not target data is data for which the mirroring is completed before the operation shutdown, the target data being target data of a restoration copy processing performed when the first information processing apparatus is restored to the active system after the information processing apparatus operates as the second information processing apparatus; and copy the target data from the own apparatus to the first information processing apparatus when determining that the target data is data for which the mirroring is completed.

7 Claims, 10 Drawing Sheets

<CLASS ID> <VOLUME ID> <SCSIID>
...

INFORMATION PROCESSING APPARATUS, INFORMATION PROCESSING SYSTEM, AND RECORDING MEDIUM STORING PROGRAM

CROSS-REFERENCE TO RELATED APPLICATION

This application is based upon and claims the benefit of priority of the prior Japanese Patent Application No. 2019-213846, filed on Nov. 7, 2019, the entire contents of which are incorporated herein by reference.

FIELD

The embodiment discussed herein is related to an information processing apparatus, an information processing system, and a recording medium storing a program.

BACKGROUND

In a cluster system having a data replication configuration, in response to a data write request from an application, an active information processing apparatus completes a write processing to a slice of a standby information processing apparatus and then makes a write completion reply to the application. The cluster system is a system in which multiple information processing apparatuses are operated as one system by cooperating with each other. The cluster system having the data replication configuration is a cluster system in which data written in a slice of an active information processing apparatus is also written in a slice of a standby information processing apparatus. The slice is a volume stored in each of the active information processing apparatus and the standby information processing apparatus. The slice stored in the active information processing apparatus and the slice stored in the standby information processing apparatus form a mirroring pair of the volume.

Examples of the related art include Japanese Laid-open Patent Publication Nos. 2019-82897 and 2009-266120 and International Publication Pamphlet No. WO 2015/198449.

SUMMARY

According to an aspect of the embodiments, an information processing apparatus includes: a memory; and a processor coupled to the memory and configured to: perform mirroring of data with a first information processing apparatus and switches from a standby system to an active system with operation shutdown of the first information processing apparatus to operate as a second information processing apparatus, the information processing apparatus; determine whether or not target data is data for which the mirroring is completed before the operation shutdown, the target data being target data of a restoration copy processing performed when the first information processing apparatus is restored to the active system after the information processing apparatus operates as the second information processing apparatus; and copy the target data from the own apparatus to the first information processing apparatus when determining that the target data is data for which the mirroring is completed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When a cluster partition occurs in the cluster system having the data replication configuration, an error occurs in the write processing to the slice of the standby information processing apparatus and processing of the application is interrupted with the data writing not being completed. The cluster partition is a state in which communication between the information processing apparatuses in the cluster system is disrupted. As a technique of reducing interruption in the processing of the application when the cluster partition occurs, there is slice preceding fallback.

Figure 7:
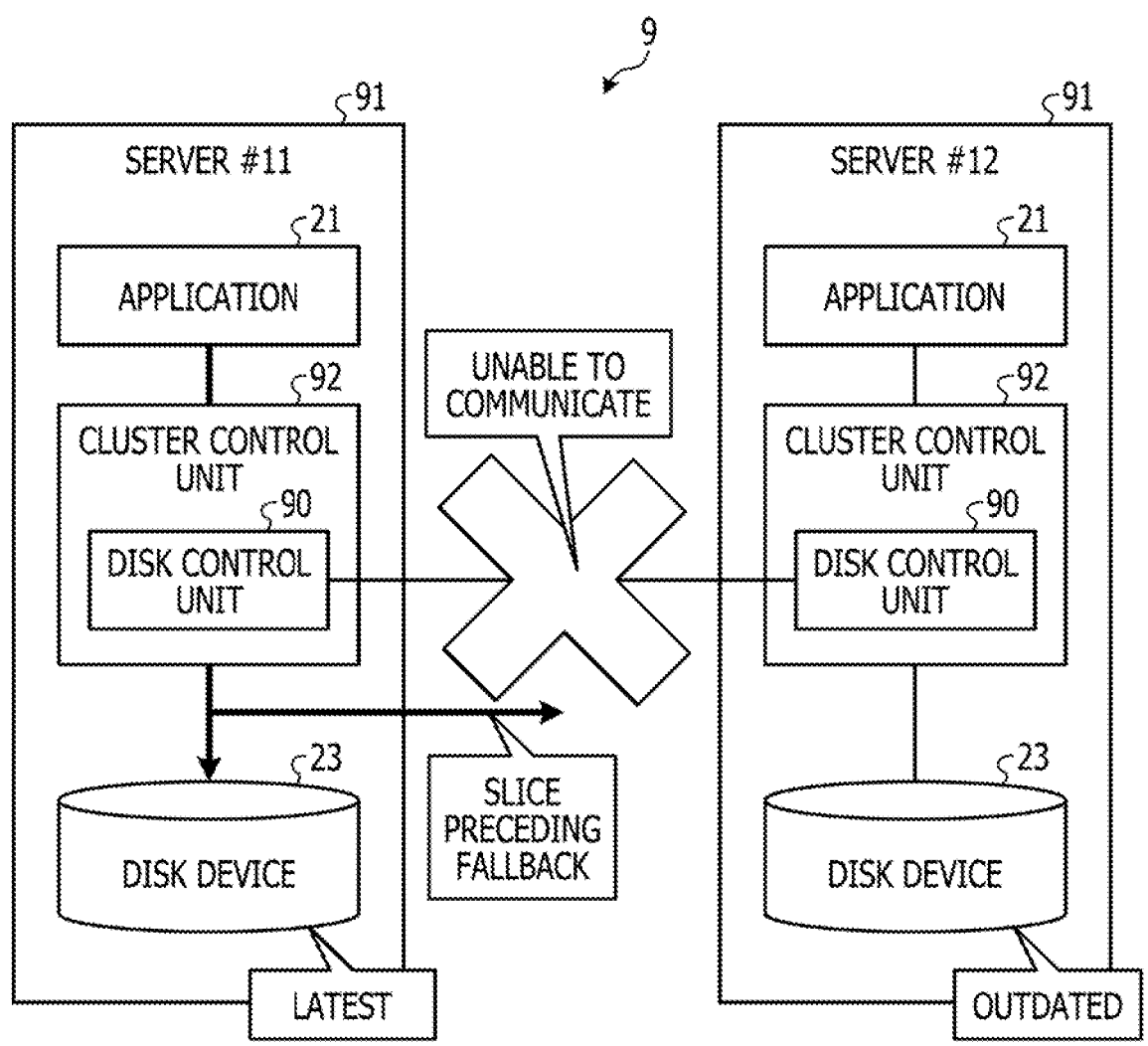
FIG. 7 is a diagram for explaining slice preceding fallback.

FIG. 7 is a diagram for explaining the slice preceding fallback. In FIG. 7, two servers 91 referred to as a server #11 and a server #12 are information processing apparatuses that construct a cluster system 9 having the data replication configuration. The server #11 is the active information processing apparatus and the server #12 is the standby information processing apparatus.

In each server 91, an application 21 is running. The application 21 writes data to slices of a disk device 23 and reads data from the slices of the disk device 23 via a cluster control unit 92. The cluster control unit 92 performs processing relating to the cluster system 9 and includes a disk control unit 90.

The disk control unit 90 controls writing of data to the slices of the disk device 23 and reading of data from the slices of the disk device 23. When the disk control unit 90 of the server #11 writes data to the slices of the own apparatus, the disk control unit 90 writes data also to the slices of the server #12. For example, the disk control unit 90 performs mirroring.

When the server #11 and the server #12 are unable to communicate with each other, the disk control unit 90 of the server #11 fails to write data to the slices of the server #12. The disk control unit 90 of the server #11 then performs the slice preceding fallback. For example, the disk control unit 90 of the server #11 writes information identifying each of the slices to which data writing has failed, to the disk device 23 as failure disk information, and gives a reply of write completion to the application 21.

Performing the slice preceding fallback when the disk control unit 90 of the server #11 fails to write data to the slices of the server #12 as described above enables reduction of the interruption in the processing of the application 21. However, the slice of the disk device 23 in the server #12 is left outdated.

As a technique that is relevant to remote copying of data, there is a technique of improving the availability of an information system including multiple storage apparatuses. In this information system, first and second storage devices respectively internally set a pair of remote copies that copy the data of the first volume of the first storage device to the second volume of the second storage device. The first and second storage apparatuses associate the remote copy pair with a third volume in a third storage apparatus. When an I/O request to the first volume fails, a host computer sends the second storage apparatus an I/O request to the second volume. When the first or second storage apparatus detects a failure in the other one of the first and second storage apparatuses or detects a coupling failure between the first and second storage apparatuses, the first or second storage apparatus stores a failure information flag indicating detection of the failure, in the third volume.

As another technique, there is a storage system that enables operation of an Active/Active configuration and that is capable of taking appropriate measures in the case of a failure. This storage system includes a first storage apparatus and a second storage apparatus each having one or more volumes, and a third storage apparatus accessible by the first storage apparatus and the second storage apparatus. The storage system operates to copy data written from the host to a volume in the first or second storage apparatus to a volume in the other one of the first and second storage apparatuses. The first storage apparatus and the second storage apparatus periodically write health check information to the third storage apparatus. When the first storage apparatus receives a write request from the host but fails to copy the write data to the second storage apparatus, the first storage apparatus reads the health check information written in the third storage apparatus. The first storage apparatus confirms that the volume of the second storage apparatus is I/O disabled, and then resumes processing relating to the write request from the host.

Figure 8:
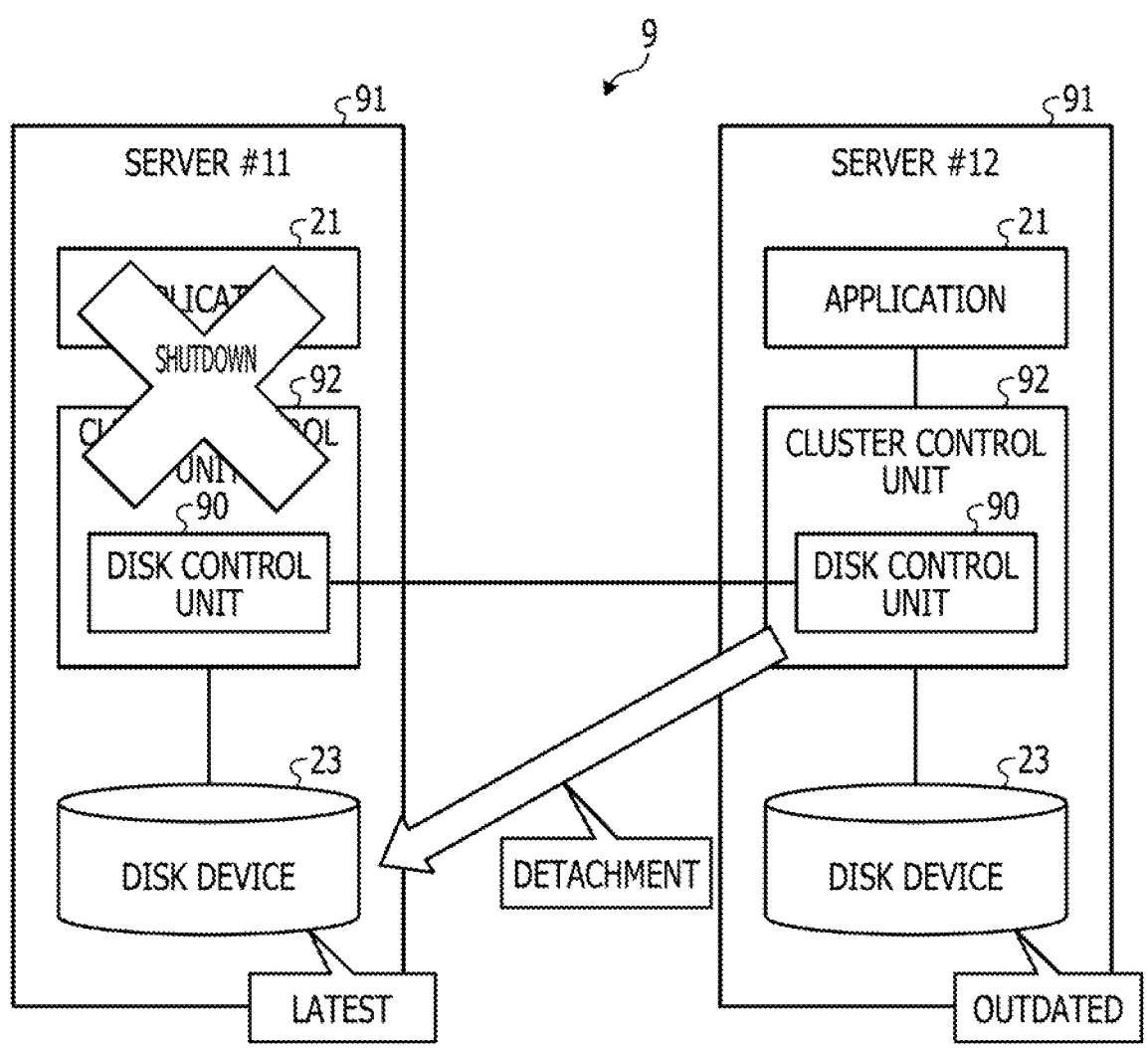
FIG. 8 is a diagram illustrating a state where a server is in a shutdown state after the slice preceding fallback.

When the server #11 shuts down after the execution of the slice preceding fallback illustrated in FIG. 7, the server #12 becomes the active system and the slices of the server #11 are detached as illustrated in FIG. 8. The application 21 then runs on the server #12 to continue tasks. Since the slices of the server #12 are in an outdated state, the application 21 of the server #12 may not be able to correctly operate. Accordingly, in this case, the application 21 is assumed to perform, for example, tasks that are more important to continue for a certain period of time than to be interrupted even if the data is partially outdated and that use data in the latest state after a lapse of a predetermined period of time.

Figure 9:
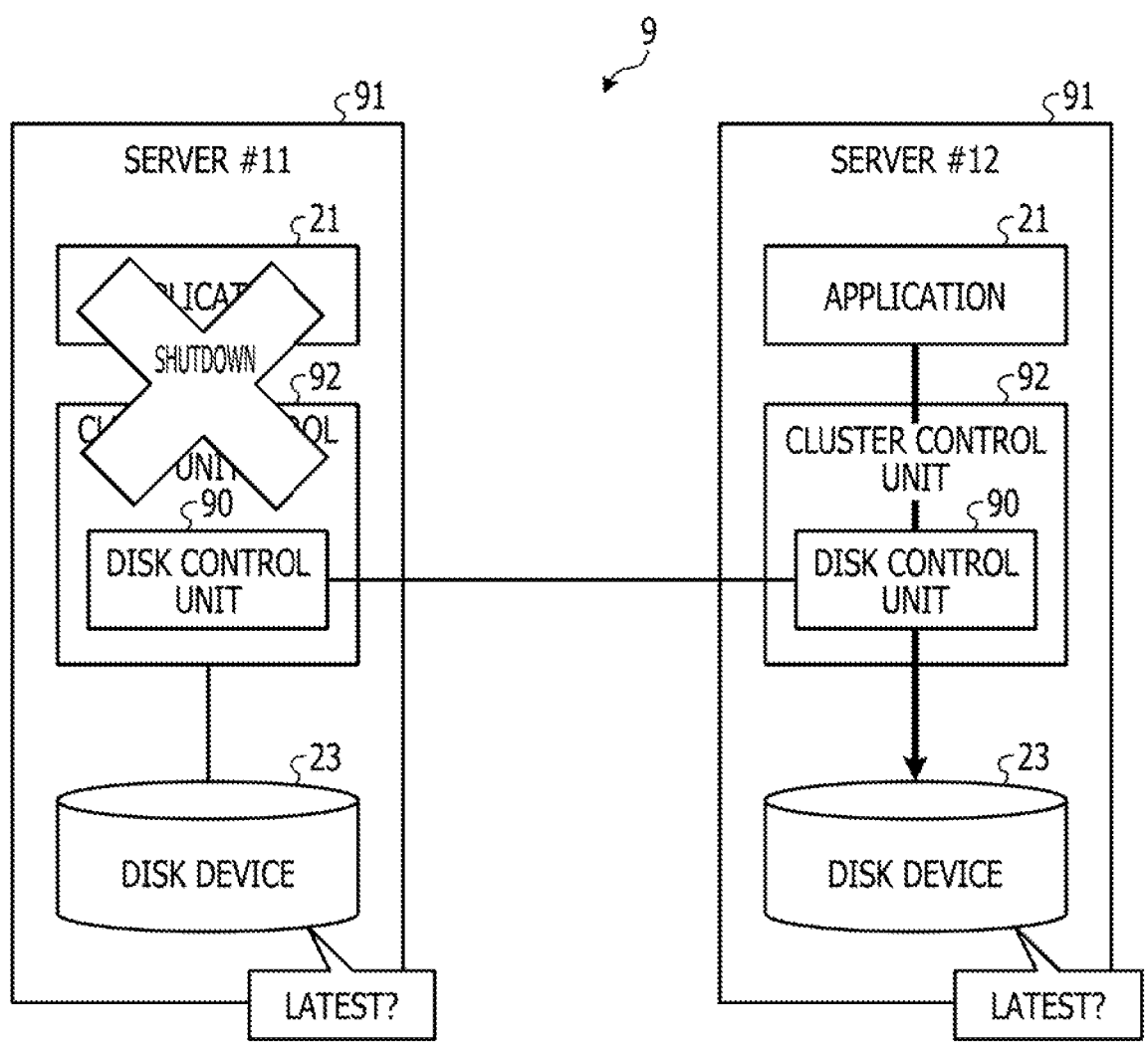
FIG. 9 is a diagram illustrating a state where data is written to a server.

When the tasks are continued and new data is written in the slices of the server #12, as illustrated in FIG. 9, the slices of which one of the server #11 and the server #12 are the latest becomes unclear. For example, part of data is the latest in the slices of the server #11 and the other part of the data is the latest in the slice of the server #12.

Figure 10:
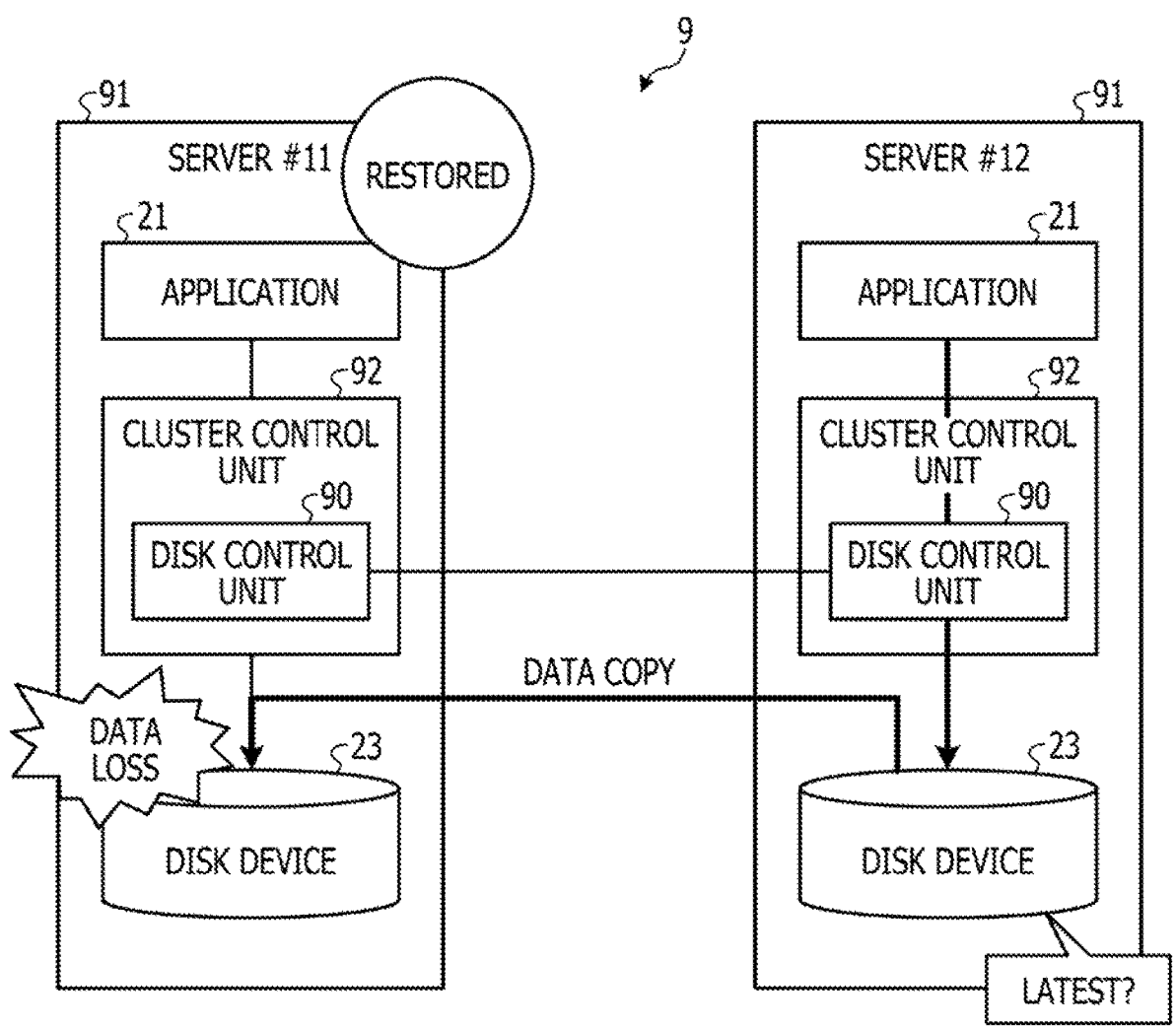
FIG. 10 is a diagram illustrating occurrence of data loss.

When the server #11 is restored in this state, the data in the slices of the server 12# is copied to the slices of the server #11 to equalize the data in the slices of the server #11 and the data in the slices of the server #12. Part of the latest data in the server #11 is then replaced with the outdated data in the server #12 and data loss occurs as illustrated in FIG. 10.

Data loss when an active information processing apparatus that has executed slice preceding fallback is restored after shutdown may be suppressed.

Hereinafter, an example of an information processing apparatus, an information processing system, an information processing method, and a program disclosed in this application is described in detail with reference to the drawings. This example does not limit the disclosed technique.

Example

Figure 1:
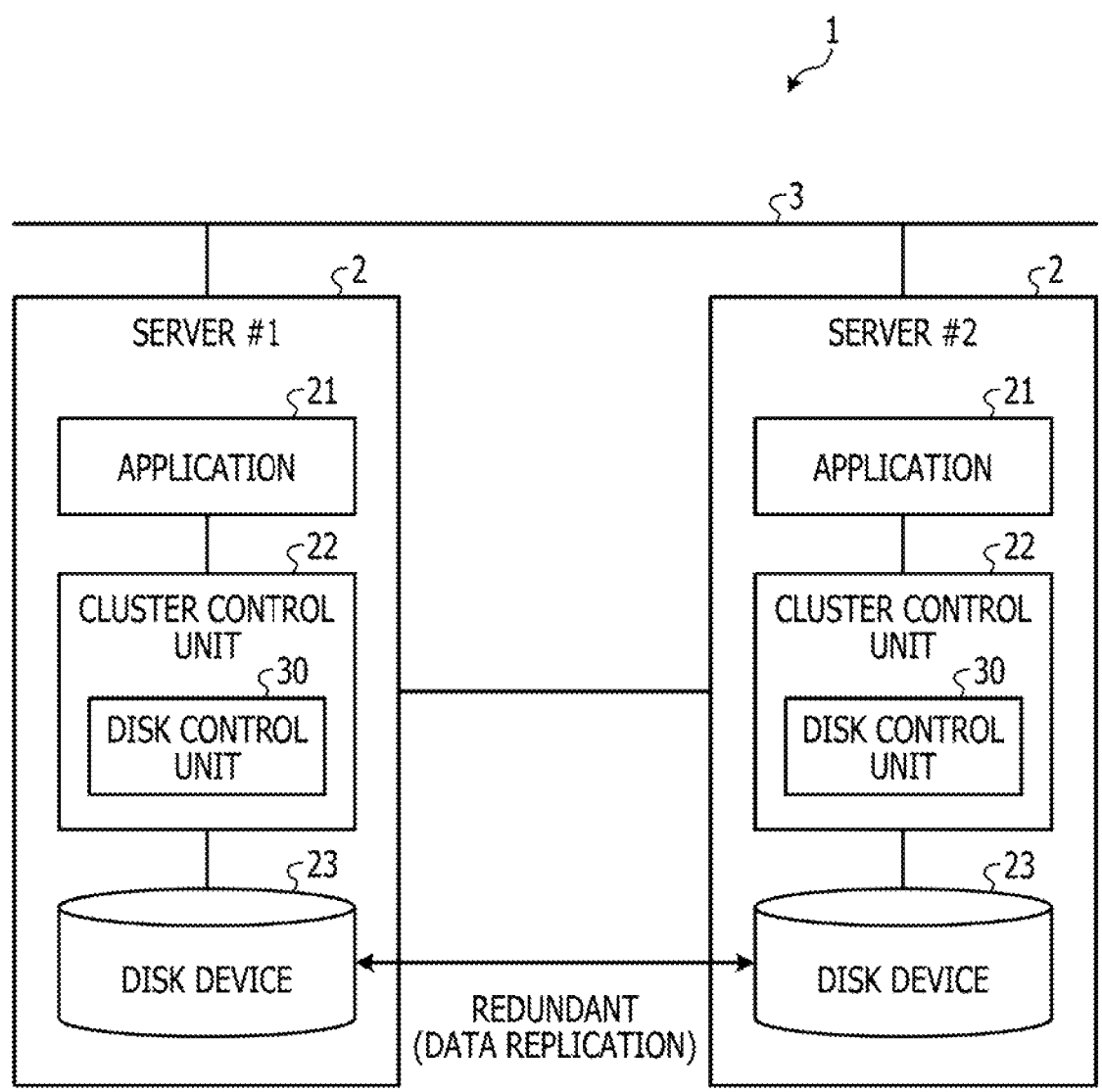
FIG. 1 is a diagram illustrating a configuration of a cluster system according to an example.

First, a configuration of a cluster system according to the example is described. FIG. 1 is a diagram illustrating the configuration of the cluster system according to the example. As illustrated in FIG. 1, the cluster system 1 according to the example includes servers 2 referred to as a server #1 and a server #2. The server #1 and the server #2 are coupled to each other by a network 3. The cluster system 1 is a cluster system having a data replication configuration. The cluster system 1 may be constructed by using three or more servers 2.

An application 21 runs on each of the servers 2. The application 21 writes data to slices of a disk device 23 and reads data from the slices of the disk device 23 via a cluster control unit 22. The cluster control unit 22 performs processing relating to the cluster system 1 and includes a disk control unit 30.

The disk control unit 30 controls writing of data to the slices of the disk device 23 and reading of data from the slices of the disk device 23. When the disk control unit 30 of the server #1 writes data to the slices of the own apparatus, the disk control unit 30 writes data also to the slices of the server #2. For example, the disk control unit 30 performs mirroring.

Figure 2:
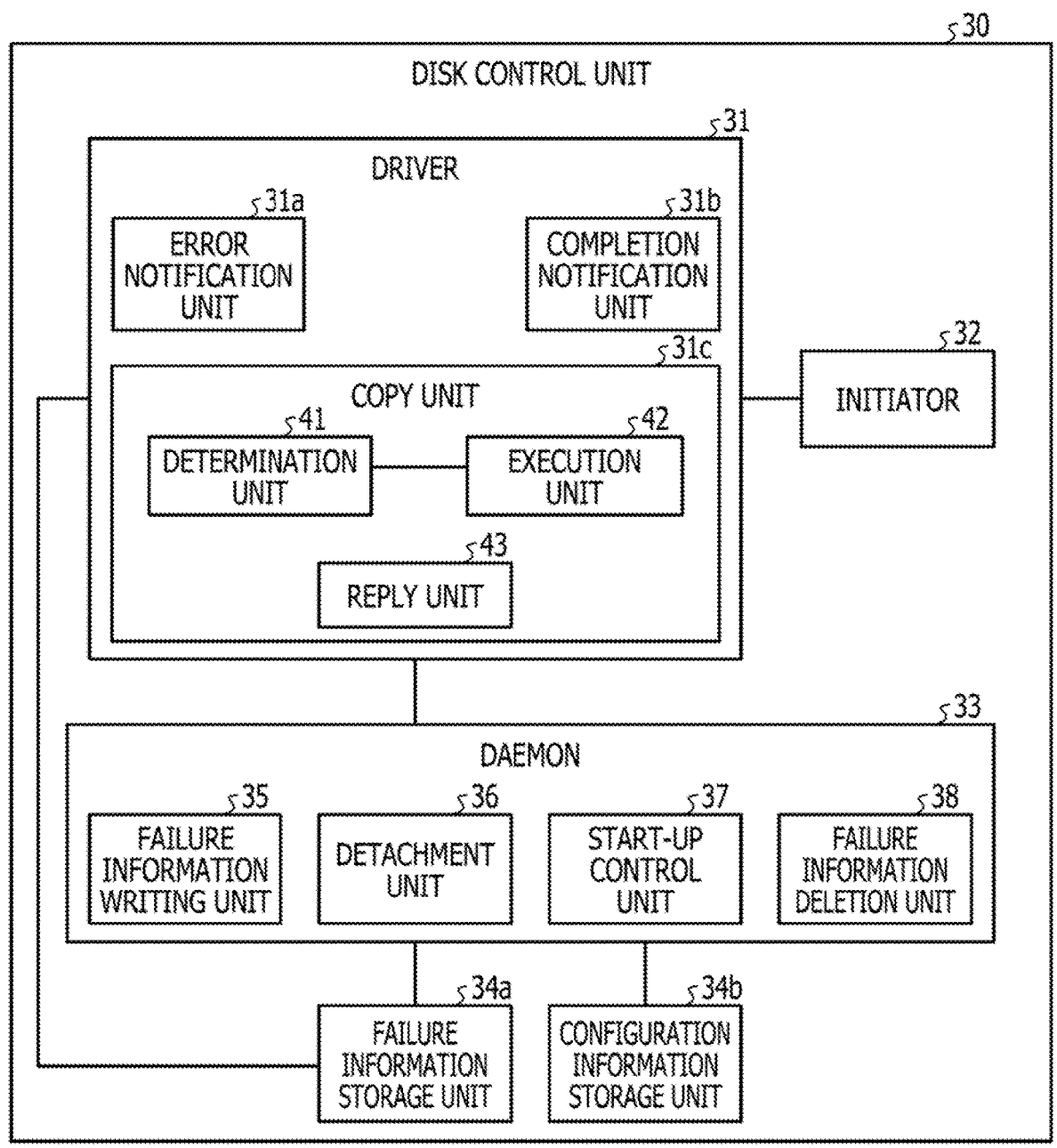
FIG. 2 is a diagram illustrating a functional configuration of a disk control unit.

Next, a functional configuration of the disk control unit 30 is described. FIG. 2 is a diagram illustrating the functional configuration of the disk control unit 30. As illustrated in FIG. 2, the disk control unit 30 includes a driver 31, an initiator 32, a daemon 33, a failure information storage unit 34a, and a configuration information storage unit 34b.

The driver 31 controls reading of data from the disk device 23 and writing of data to the disk device 23. The driver 31 receives a data write request from the application 21 and controls writing of data to a local disk and a remote disk. The initiator 32 writes data to the remote disk based on an instruction from the driver 31. The driver 31 includes an error notification unit 31a, a completion notification unit 31b, and a copy unit 31c.

When the error notification unit 31a is notified of occurrence of an I/O error in the data writing from the initiator 32 to the remote disk, the error notification unit 31a suspends the write processing and notifies the daemon 33 of the I/O error.

When the daemon 33 that has been notified of the occurrence of the I/O error notifies the completion notification unit 31b of completion of writing of failure disk information, the completion notification unit 31b restarts the write processing and notifies the application 21 of the completion of the writing.

The copy unit 31c performs processing of achieving consistency between the local disk and the remote disk by using the failure disk information at start-up of the server 2 when the other server 2 is normally operating.

When one server 2 is restored from a shutdown state to an active system and the other server 2 returns from the active system to a standby system, the copy unit 31c performs a restoration copy processing of achieving consistency between the slices of the other server 2 and the slices of the own apparatus in cooperation with the copy unit 31c of the other server 2. In the restoration copy processing, the server 2 that returns from the active system to the standby system operates as a copy source server 2, and the server 2 that is restored from the shutdown state to the active system operates as a copy destination server 2.

The copy unit 31c of the server 2 that returns from the active system to the standby system instructs the other server 2 to write data in the slices stored in the disk device 23 of the own apparatus, as the restoration copy processing. However, since data in the slice whose identification information is included in the failure disk information of the other server 2 is written only in the active server 2 before the shutdown, the copy unit 31c of the server 2 that returns from the active system to the standby system outputs warning for this slice without setting the slice as a copy target.

The copy unit 31c of the server 2 that returns from the active system to the standby system makes an inquiry to the other server 2 and determines whether or not the failure disk information of the other server 2 includes the information identifying each slice. The copy unit 31c of the server 2 that returns from the active system to the standby system also adds, for example, information identifying a volume and a message prompting a user to confirm which of the slices of the respective two servers 2 is the latest, to the warning.

The copy unit 31c of the server 2 that is restored from the shutdown state to the active system checks whether or not the information identifying the slice is included in the failure disk information in response to the inquiry from the copy unit 31c of the other server 2, and gives a reply indicating whether or not the information identifying the slice is recorded. When the copy unit 31c of the server 2 that is restored from the shutdown state to the active system receives the data of the slice from the copy unit 31c of the other server 2, the copy unit 31c of the restored server 2 writes the data to the corresponding slice.

The copy unit 31c includes a determination unit 41, an execution unit 42, and a reply unit 43. When the apparatus including the determination unit 41 is the server 2 that returns from the active system to the standby system in the restoration copy processing, the determination unit 41 makes an inquiry to the other server 2 and determines whether or not the failure disk information of the other server 2 includes the information identifying each slice.

When the determination unit 41 determines that the failure disk information of the other server 2 includes the information identifying the slice, the execution unit 42 outputs warning. Meanwhile, when the determination unit 41 determines that the failure disk information of the other server 2 does not include the information identifying the slice, the execution unit 42 sends the data of the slice to the other server 2.

When the apparatus including the reply unit 43 is the server 2 that returns from the shutdown state to the active system and the reply unit 43 receives the inquiry from the other server 2, the reply unit 43 refers to the failure information storage unit 34a and determines whether or not the failure disk information includes the information identifying the slice. The reply unit 43 then sends the determination result on whether or not the failure disk information includes the information identifying the slice to the other server 2.

The determination unit 41 may receive the failure disk information instead of the determination result from the other server 2. The determination unit 41 may acquire the determination result or the failure disk information for all slices from the other server 2 at once. The reply unit 43 may send the failure disk information instead of the determination result in response to the inquiry from the other server 2. The reply unit 43 may send the determination result or the failure disk information for all slices at once. The failure information storage unit 34a may also store slice update processing information on slices for which mirroring is completed or not completed, as the failure disk information.

When receiving an event, the daemon 33 performs processing corresponding to the event. The event includes the I/O error as well as a volume start-up request, a copy completion notification, and the like.

Figures 3A, 3B:
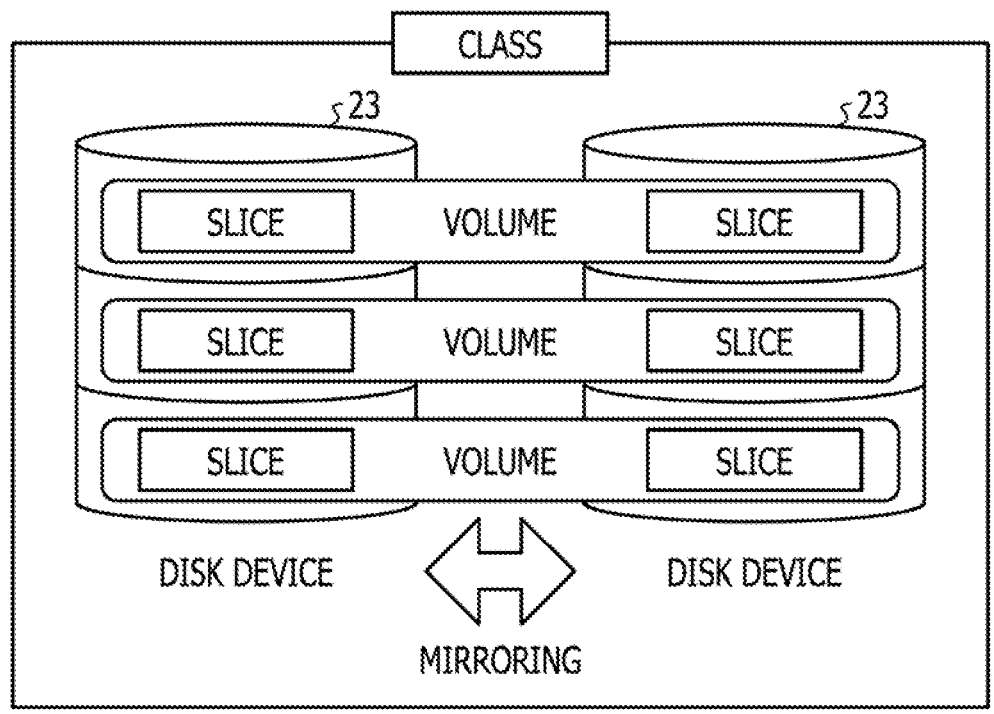
FIG. 3A is a diagram illustrating an example of a failure information storage unit.
FIG. 3B is a diagram illustrating relationships among a class, volumes, and slices.

The failure information storage unit 34a stores the failure disk information. Information in the failure information storage unit 34a may be accessed from the other server 2. FIG. 3A is a diagram illustrating an example of the failure information storage unit 34a. As illustrated in FIG. 3A, the failure information storage unit 34a stores a class ID, a volume ID, and a Small Computer System Interface (SCSI) ID for each slice in which the I/O error has occurred, as the failure disk information.

The class ID is an identifier identifying a class, the volume ID is an identifier identifying a volume, and the SCSI ID is an identifier identifying one of disk devices in a mirroring pair. FIG. 3B is a diagram illustrating relationships among a class, volumes, and slices. As illustrated in FIG. 3B, the disk devices 23 in the mirroring pair are managed as a class, and the class includes multiple volumes. Each volume is formed of slices forming a mirroring pair. Each slice is thus specified by using the class ID, the volume ID, and the SCSI ID.

The configuration information storage unit 34b stores configuration information. For example, the configuration information storage unit 34b stores information on the configuration of the cluster system 1. The configuration information storage unit 34b stores a state of each slice.

The daemon 33 includes a failure information writing unit 35, a detachment unit 36, a start-up control unit 37, and a failure information deletion unit 38. When writing of data to the remote disk fails, the failure information writing unit 35 writes the failure disk information to the failure information storage unit 34a. The failure information writing unit 35 then notifies the driver 31 that the failure disk information has been written to the failure information storage unit 34a. When writing of data to the remote disk fails, the failure information writing unit 35 may write information indicating that mirroring is not completed to the failure information storage unit 34a.

When writing of data to the remote disk fails, the detachment unit 36 detaches a remote slice. For example, the detachment unit 36 acquires a cluster lock and changes the configuration information. The detachment unit 36 detaches the remote slice also when the other server 2 shuts down and the own apparatus switches from the standby system to the active system.

The start-up control unit 37 acquires the failure disk information recorded in the own server 2 and the failure disk information recorded in the remote server 2 at the start-up of the volume, and updates the configuration information based on the acquired failure disk information.

When consistency is achieved between the slices in the mirroring pair by the copy processing, the failure information deletion unit 38 deletes information on the slices having achieved consistency from the failure disk information and changes the states of the slices in the configuration information to normal.

Figure 4:
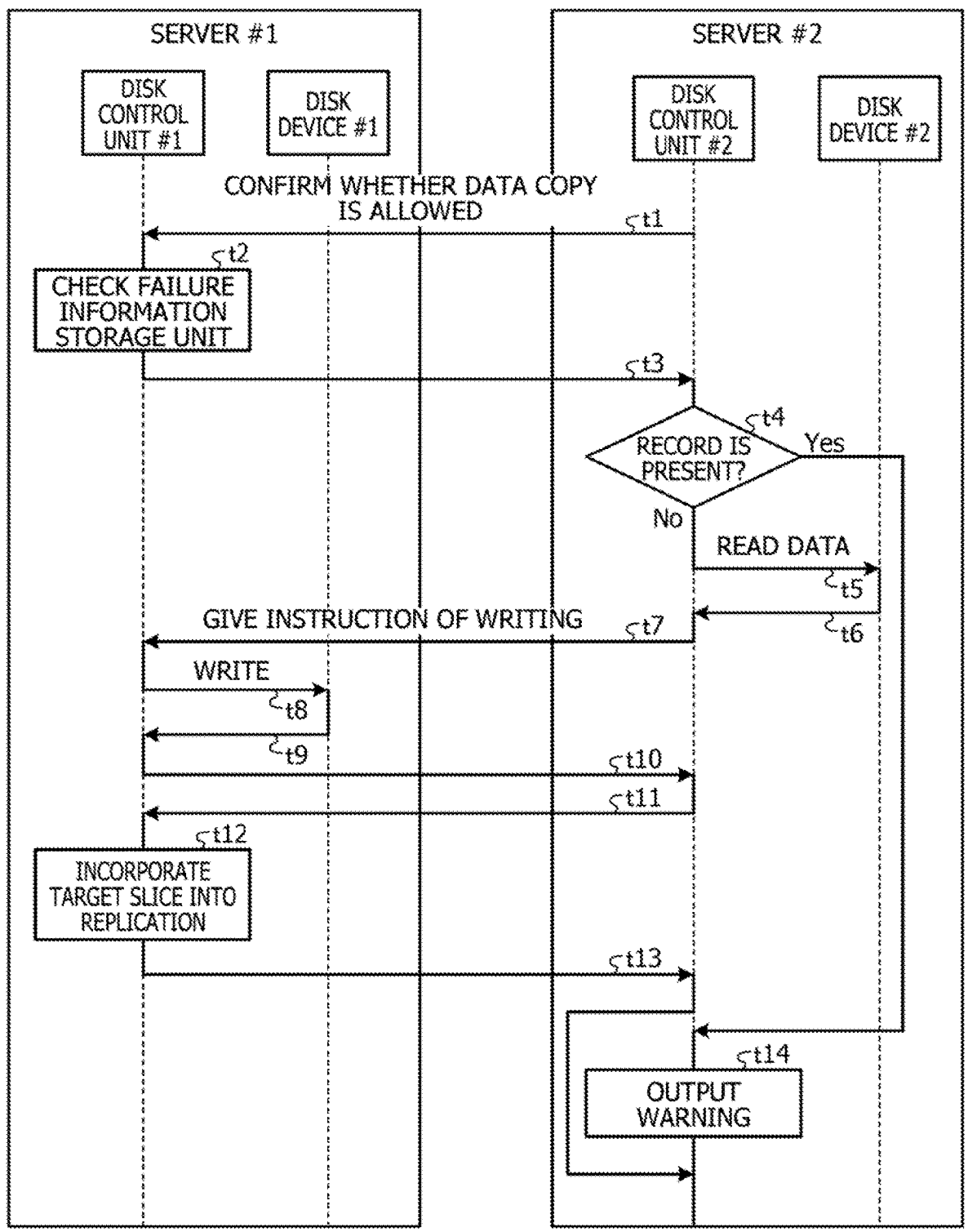
FIG. 4 is a diagram illustrating a sequence of a restoration copy processing.
Figure 5:
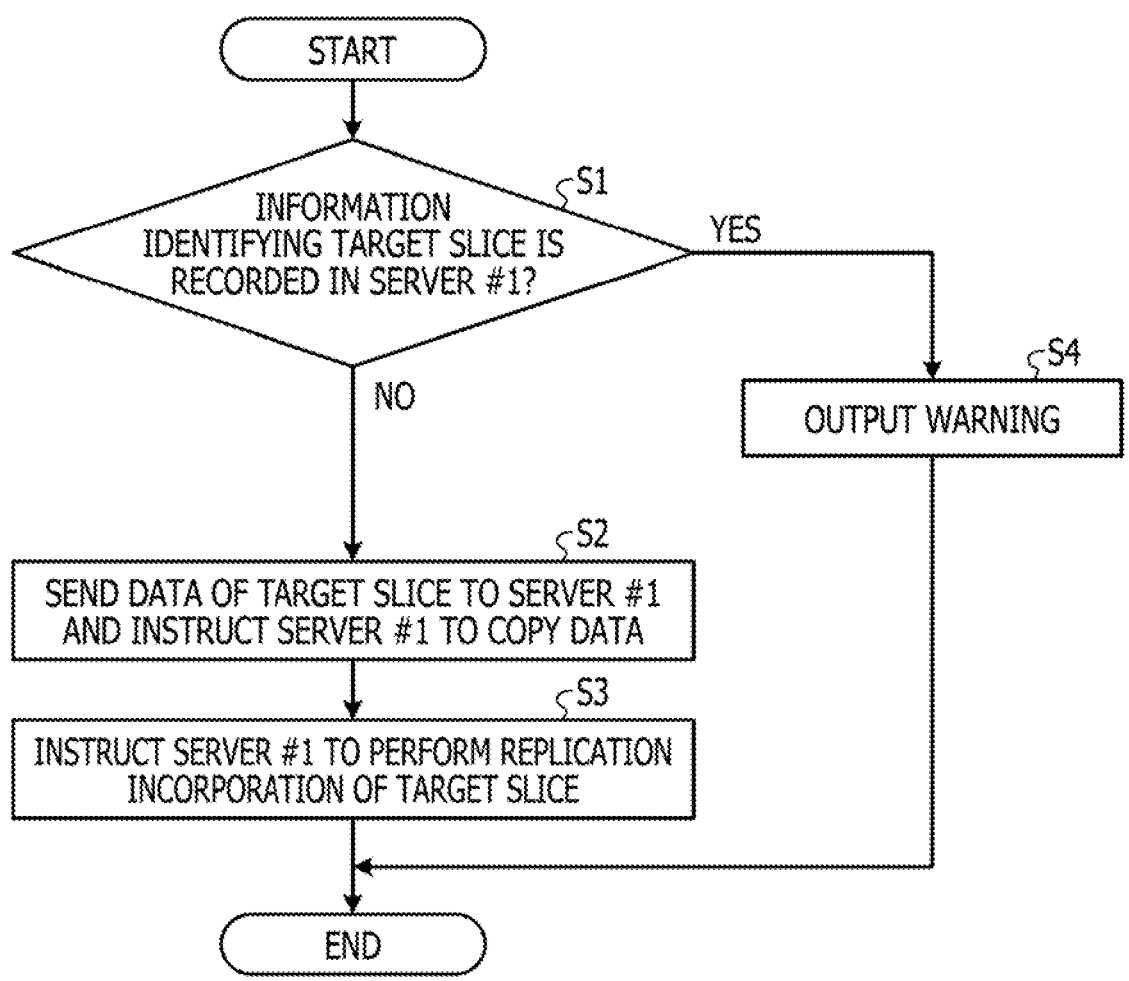
FIG. 5 is a flowchart illustrating a flow of the restoration copy processing.

Next, a flow of the restoration copy processing is described by using FIGS. 4 and 5. In FIGS. 4 and 5, a server #1 is the server 2 that returns from the shutdown state to the active system in restoration, and a server #2 is the server 2 that returns from the active system to the standby system. A disk control unit #1 is the disk control unit 30 of the server #1, a disk control unit #2 is the disk control unit 30 of the server #2, a disk device #1 is the disk device 23 of the server #1, and a disk device #2 is the disk device 23 of the server #2. The disk control unit #2 repeats processing illustrated in FIGS. 4 and 5 for all slices stored in the disk device #2.

FIG. 4 is a diagram illustrating a sequence of the restoration copy processing. As illustrated in FIG. 4, the disk control unit #2 makes an inquiry to the disk control unit #1 to check whether or not data copy of a target slice is allowed (t1). When the disk control unit #1 receives the inquiry from the disk control unit #2 together with information identifying the target slice, the disk control unit #1 checks the failure information storage unit 34a (t2), and determines whether or not the information identifying the target slice is recorded in the failure information storage unit 34a. The disk control unit #1 then gives a reply of "recorded" (copy not allowed) or "not recorded" (copy allowed) to the disk control unit #2 as a determination result (t3).

The disk control unit #2 determines whether the reply is recorded (copy not allowed) or not recorded (copy allowed) (t4), and if not recorded, reads the data of the target slice from the disk device #2 (t5) and receives it from the disk device #2 (t6). The disk control unit #2 then sends the data to the disk control unit #1 and instructs the disk control unit #1 to write the data (t7). The disk control unit #1 having received the data writes the received data to the target slice (t8), and receives a reply from the disk device #1 (t9). The disk control unit #1 then gives a reply of write completion to the disk control unit #2 (t10).

The disk control unit #2 then instructs the disk control unit #1 to perform replication incorporation of the target slice (t11). The disk control unit #1 incorporates the target slice into replication (t12), and gives a reply of completion of incorporation to the disk control unit #2 (t13). The disk control unit #2 then proceeds to the processing of the next slice.

When the reply from the disk control unit #1 is determined to be recorded in t4, the disk control unit #2 outputs warning (t14) and proceeds to the processing of the next slice without sending the data to the disk control unit #1.

When the restoration copy processing is completed for all slices, the server #2 switches to the state of standby system. When the restoration copy processing is completed for all slices, the server #1 switches to the state of active system.

FIG. 5 is a flowchart illustrating a flow of the restoration copy processing. As illustrated in FIG. 5, the disk control unit #2 makes an inquiry to the server #1 to determine whether or not the information identifying the target slice is recorded in the server #1. (step S1). When the information identifying the target slice is not recorded, the disk control unit #2 sends the data of the target slice to the server #1 and instructs the server #1 to copy the data (step S2). The disk control unit #2 then instructs the server #1 to perform replication incorporation of the target slice (step S3), and proceeds to the processing of the next slice.

When the information identifying the target slice is recorded in the server #1, the disk control unit #2 outputs warning (step S4), and proceeds to the processing of the next slice.

As described above, in the example, when the active server #1 performs slice preceding fallback and then shuts down and the standby server #2 switches to the active system, in the restoration of the server #1, the disk control units 30 of the server #2 and the server #1 perform the restoration copy processing in cooperation. In the restoration copy processing, the determination unit 41 of the server #2 determines whether or not the target slice is a slice for which mirroring is not completed before the shutdown and for which data update is not reflected in the server #2. When the determination unit 41 determines that the target slice is not a slice for which mirroring is not completed before the shutdown, the execution unit 42 of the server #2 copies the data of the slice to the server #1. Accordingly, when there is the latest data in the server #1, the disk control unit 30 of the server #2 may avoid replacement of the latest data with the outdated data of the server #2 and suppress data loss.

In the example, since the determination unit 41 of the server #2 makes an inquiry to the server #1 and determines whether or not the target slice is a slice for which mirroring is not completed before the shutdown, the cluster system 1 does not have to include another device for the restoration copy processing.

In the example, the copy unit 31c of the server #1 gives a reply indicating whether or not the information for identifying the slice is recorded in the failure disk information, in response to the inquiry from the determination unit 41 of the server #2. Accordingly, the determination unit 41 of the server #2 may determine whether or not data update for the slice is performed only in the server #1 before the shutdown and is not reflected in the server #2. This makes it possible to determine whether or not the mirroring is completed. Accordingly, even in a system that does not use a third server such as a management server, a new mechanism in which the server #1 manages the data update information (failure disk information) of the server #1 itself allows the server #2, being the copy source in the restoration copy processing, to mainly determine whether or not to allow the copying.

Although the disk control unit 30 has been described in the example, a disk control program having similar functions may be obtained by implementing the configuration of the disk control unit 30 by software. A computer that executes the disk control program is described.

Figure 6:
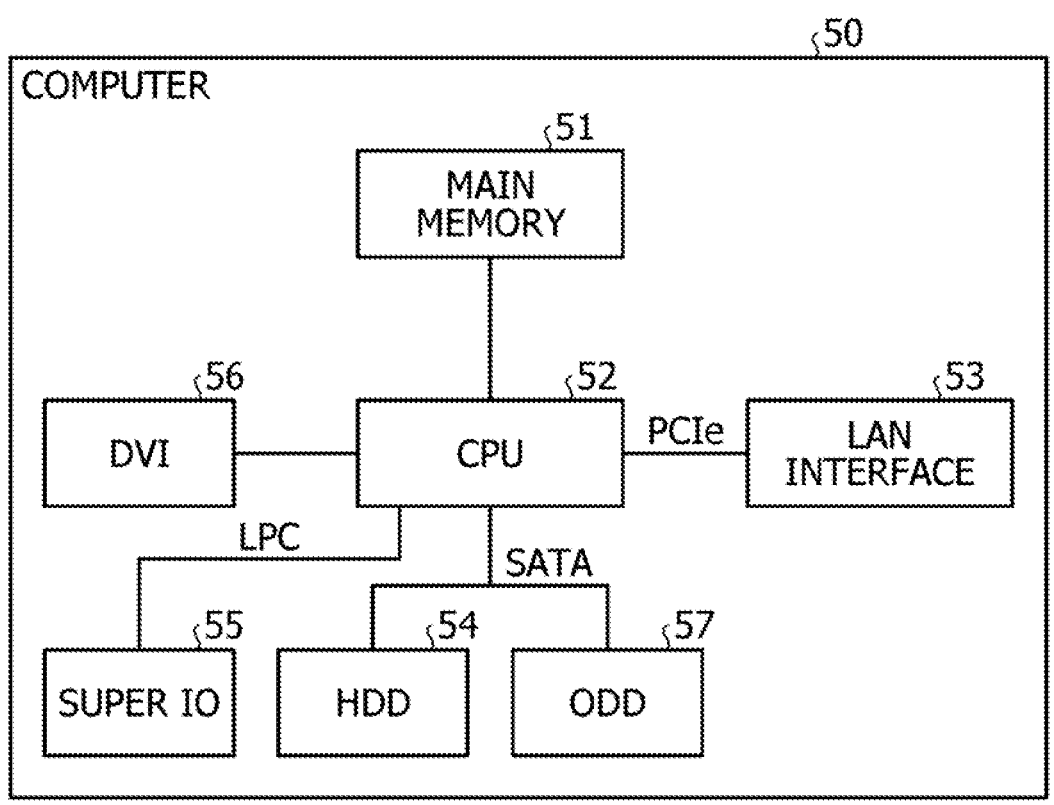
FIG. 6 is a diagram illustrating a hardware configuration of a computer that executes a disk control program according to the example.

FIG. 6 is a diagram illustrating a hardware configuration of the computer that executes the disk control program according to the example. As illustrated in FIG. 6, a computer 50 includes a main memory 51, a central processing unit (CPU) 52, a local area network (LAN) interface 53, and a hard disk drive (HDD) 54. The computer 50 further includes a super input output (IO) 55, a digital visual interface (DVI) 56, and an optical disk drive (ODD) 57.

The main memory 51 is a memory that stores a program, results in middle of execution of the program, and the like. The CPU 52 is a central processing unit that reads the program from the main memory 51 and executes the program. The CPU 52 includes a chipset including a memory controller.

The LAN interface 53 is an interface that is used to couple the computer 50 to another computer through the LAN. The HDD 54 is a disk device that stores a program and data. The super IO 55 is an interface that is used to couple input devices such as a mouse and a keyboard. The DVI 56 is an interface that is used to couple a liquid crystal display device, and the ODD 57 is a device that reads and writes data from and to a digital versatile disc (DVD).

The LAN interface 53 is coupled to the CPU 52 by Peripheral Component Interconnect Express (PCIe) and the HDD 54 and the ODD 57 are coupled to the CPU 52 by Serial Advanced Technology Attachment (SATA). The super IO 55 is coupled to the CPU 52 by low pin count (LPC).

The disk control program executed by the computer 50 is stored in a compact disc recordable (CD-R) which is an example of a recording medium readable by the computer 50, is read from the CD-R by the ODD 57, and is installed in the computer 50. Alternatively, the disk control program is stored in a database or the like of another computer system coupled through the LAN interface 53, is read from the database or the like, and is installed in the computer 50. The disk control program thus installed is stored in the HDD 54, is loaded into the main memory 51, and is executed by the CPU 52.

In the example, the case in which the failure disk information is stored in the active server 2 is described. However, an apparatus other than the active server 2 may store the failure disk information as long as the apparatus is accessible mainly by the copy source server 2 that performs the restoration copy processing of the data in the slice for the restored server 2.

With regard to the embodiment including the aforementioned example, the following appendices are disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
   perform mirroring of data with another information processing apparatus;
   switch from a standby system to an active system, when an operation of the another information processing apparatus in the active system is stopped, to operate as the information processing apparatus in the active system;
   determine whether target data, which is data on which a restoration copy processing is performed when the another information processing apparatus is restored to the active system after the information processing apparatus operates in the active system, is data for which the mirroring is completed before the operation of the another information processing apparatus is stopped; and
   copy the target data to the another information processing apparatus when determining that the target data is data for which the mirroring is completed.

2. The information processing apparatus according to claim 1, wherein the processor determines whether or not the target data is data for which the mirroring is completed before the operation of the another information processing apparatus is stopped by making an inquiry to the another information processing apparatus.

3. The information processing apparatus according to claim 2, wherein the processor receives a reply including data update processing information of the another information processing apparatus from the another information processing apparatus in response to the inquiry and determines whether the target data is data for which the mirroring is completed and in which data update in the another information processing apparatus before the operation of the another information processing apparatus is stopped is reflected in the information processing apparatus or data for which the mirroring is not completed and in which the data update is not reflected in the information processing apparatus, based on the received reply.

4. The information processing apparatus according to claim 3, wherein the data is a slice, and the target data for which the mirroring is not completed includes data for which a write completion reply is made from the another information processing apparatus to an application by slice preceding fallback.

5. An information processing apparatus system comprising:
   a first information processing apparatus and a second information processing apparatus that perform mirroring of data,
   wherein the first information processing apparatus operates as an active system, the second information processing apparatus switches from a standby system to the active system when an operation of the first information processing apparatus in the active system is stopped, and the second information processing apparatus includes a second processor configure to:
   make an inquiry on whether or not target data, which is data on which a restoration copy processing is performed when the another information processing apparatus is restored to the active system after the information processing apparatus operates in the active system, is data for which the mirroring is completed before the operation of the first information processing apparatus is stopped; and
   copy the target data to the first information processing apparatus when the second information processing apparatus receives a reply that the target data is data for which the mirroring is completed in response to the inquiry,
   the first information processing apparatus includes a first processor configured to:
   determine whether the target data is data for which mirroring is completed; and
   give a reply indicating a result of the determination when receiving the inquiry.

6. A non-transitory recording medium storing a program causing an information processing apparatus to execute processing of:
   performing, by an information processing apparatus, mirroring of data with another information processing apparatus;
   switching from a standby system to an active system, when an operation of the another information processing apparatus in the active system is stopped, to operate as the information processing apparatus in the active system;
   determining whether or not target data, which is data on which a restoration copy processing is performed when the another information processing apparatus is restored to the active system after the information processing apparatus operates in the active system, is data for which the mirroring is completed before the operation of the another information processing apparatus is stopped; and copying the target data to the another information processing apparatus when determining that the target data is data for which the mirroring is completed.

7. The non-transitory recording medium according to claim 6, wherein the processing of determining includes determining whether or not the target data is data for which the mirroring is completed before the operation of the another information processing apparatus is stopped by making an inquiry to the another information processing apparatus.

* * * * *